United States Patent
Xie et al.

(10) Patent No.: US 11,405,659 B2
(45) Date of Patent: Aug. 2, 2022

(54) METHOD AND TERMINAL DEVICE FOR VIDEO RECORDING

(71) Applicant: BEIJING DAJIA INTERNET INFORMATION TECHNOLOGY CO., LTD., Beijing (CN)

(72) Inventors: Wannan Xie, Beijing (CN); Wei Fan, Beijing (CN); Jie Li, Beijing (CN)

(73) Assignee: Beijing Dajia Internet Information Technology Co., Ltd., Beijing (CN)

( * ) Notice: Subject to any disclaimer, the term of this patent is extended or adjusted under 35 U.S.C. 154(b) by 0 days.

(21) Appl. No.: 17/108,353

(22) Filed: Dec. 1, 2020

(65) Prior Publication Data

US 2021/0204001 A1 Jul. 1, 2021

(30) Foreign Application Priority Data

Dec. 31, 2019 (CN) .......................... 201911417875.0

(51) Int. Cl.
*H04N 21/2187* (2011.01)
*G10L 17/06* (2013.01)
(Continued)

(52) U.S. Cl.
CPC ......... *H04N 21/2187* (2013.01); *G10L 17/06* (2013.01); *H04L 67/306* (2013.01); *H04N 21/4334* (2013.01); *H04N 21/6405* (2013.01)

(58) Field of Classification Search
CPC ........... H04N 21/2187; H04N 21/4334; H04N 21/6405; H04N 21/433; H04N 21/442;
(Continued)

(56) References Cited

U.S. PATENT DOCUMENTS

| 10,028,004 B1 | 7/2018 | Anderson |
| 2016/0012465 A1* | 1/2016 | Sharp .................. G06Q 20/386 |
| | | 705/14.17 |

(Continued)

FOREIGN PATENT DOCUMENTS

| CN | 106792122 A | 5/2017 |
| CN | 107959864 A | 4/2018 |

(Continued)

OTHER PUBLICATIONS

The State Intellectual Property Office of People's Republic of China, First Office Action for CN application 201911417875.0 with English translation.

*Primary Examiner* — Michael R Telan
(74) *Attorney, Agent, or Firm* — Timothy W. Menasco, Esq.; Harter Secrest & Emery LLP

(57) ABSTRACT

Embodiments of the present disclosure provide a method for video recording, an apparatus for video recording, and a terminal device. The method can be applied to a first terminal. The first terminal can be configured to play a live video of a second terminal when the second terminal is on live. The method can include: obtaining a user identifier of a target audience logging into the first terminal; obtaining voice data of an anchor in the live video within a time period in response to detecting a first event, wherein the time period is after a current time point; and generating a video through screen recording based on the user identifier and the voice data.

17 Claims, 3 Drawing Sheets

(51) Int. Cl.
*H04L 67/306* (2022.01)
*H04N 21/433* (2011.01)
*H04N 21/6405* (2011.01)

(58) Field of Classification Search
CPC ......... H04N 21/44213; H04N 21/4784; H04N 21/4788; H04N 21/23418; H04N 21/2743; G10L 17/06; G10L 15/12; G10L 2015/088; H04L 67/306; H04L 67/12; G06Q 30/0217

See application file for complete search history.

(56) References Cited

U.S. PATENT DOCUMENTS

| | | | | |
|---|---|---|---|---|
| 2017/0006322 | A1* | 1/2017 | Dury | H04N 21/254 |
| 2019/0080375 | A1* | 3/2019 | Alvarez | H04L 51/32 |
| 2020/0322685 | A1* | 10/2020 | Kiyooka | G06Q 30/0201 |
| 2021/0176532 | A1* | 6/2021 | Kiyooka | G06Q 30/0222 |

FOREIGN PATENT DOCUMENTS

| | | |
|---|---|---|
| CN | 108377396 A | 8/2018 |
| CN | 108900891 A | 11/2018 |

\* cited by examiner

METHOD AND TERMINAL DEVICE FOR VIDEO RECORDING

This application is based on and claims priority to Chinese Patent Application No. 201911417875.0, filed on Dec. 31, 2019, the disclosure of which is herein incorporated by reference in its entirety.

TECHNICAL FIELD

The present disclosure relates to a field of computer technologies, and more particularly, to a method for video recording, an apparatus for video recording, and a terminal device.

BACKGROUND

With the development of network technologies, network broadcasting technologies for watching videos simultaneously on different communication platforms through a network system are popularized. When an anchor publishes network broadcasting data through live streaming platforms according to a network broadcasting method, audiences watch the network broadcasting videos simultaneously through the live streaming platforms such as televisions, mobile phones, and tablet computers. In order to improve user experience, the audiences may interact with the anchor by sending messages and gifts through the live streaming platforms. During the interaction between the audiences and the anchor, great contents worth remembering or sharing may be created. Currently, the audiences could only manually trigger video recording to record these contents. However, manual recording often misses timing of live video recording, and the method of manually recording live content is inconvenient for the audiences, thus the user experience is poor.

SUMMARY

According to a first aspect of embodiments of the present disclosure, a method for video recording is provided. The method is applicable for a first terminal. The first terminal is configured to play a live video of a second terminal when the second terminal is on live. The method includes: obtaining a user identifier of a target audience logging into the first terminal; obtaining voice data of an anchor in the live video within a time period in response to detecting a first event, in which the time period is after a current time point; and generating a video through screen recording based on the user identifier and the voice data.

According to a second aspect of embodiments of the present disclosure, a terminal device is provided. The terminal device includes a processor, a communication interface, a memory, and a communication bus. The processor, the communication interface, and the memory are configured to implement mutual communication through the communication bus. The memory is configured to store computer programs. The processor is configured to implement the method for video recording according to any one of embodiments of the first aspect by executing the program stored in the memory.

According to a third aspect of embodiments of the present disclosure, a storage medium is provided. A computer program is stored in the storage medium, and when the computer program is executed by a processor, the method for video recording according to any one of the foregoing embodiments of the first aspect is implemented.

According to a fourth aspect of embodiments of the present disclosure, a computer program product containing instructions is provided. When the computer program product is running on a computer, the computer is caused to execute the method for video recording according to any one of the above-mentioned embodiments of the first aspect.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure, and do not constitute an improper limitation of this disclosure

DETAILED DESCRIPTION

In order to enable those of ordinary skill in the art to better understand the technical solution of the present disclosure, the technical solution in the embodiments of the present disclosure will be described clearly and completely with reference to the accompanying drawings.

It should be noted that the terms "first" and "second" in the specification and claims of the present disclosure and the above-mentioned drawings are used to distinguish similar objects, and are not necessarily used to describe a specific order or sequence. It should be understood that the data used in this way could be interchanged under appropriate circumstances so that the embodiments of the present disclosure described herein could be implemented in an order other than those illustrated or described herein. The implementation manners described in the following exemplary embodiments do not represent all implementation manners consistent with the present disclosure. Instead, they are merely examples of devices and methods consistent with some aspects of the present disclosure as detailed in the appended claims.

Embodiments of the present disclosure provide a method for video recording, an apparatus for video recording, a terminal device, a storage medium, and a computer program product containing instructions, which will be illustrated respectively below.

Figure 1:
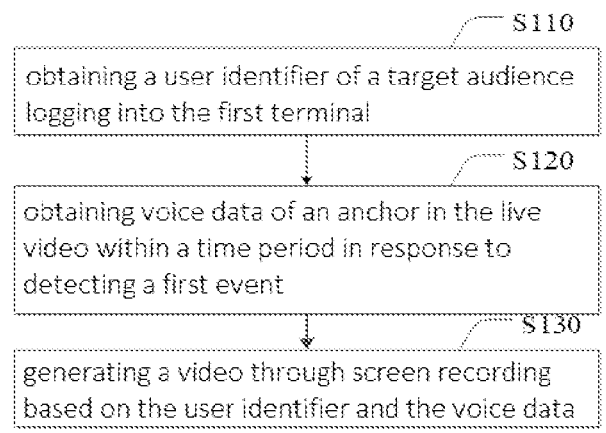
FIG. 1 is a schematic diagram of a method for video recording according to an embodiment.

FIG. 1 is a schematic diagram of a method for video recording according to an embodiment. The method for video recording is applicable for a first terminal. The first terminal is configured to play a live video of a second terminal when the second terminal is on live. As illustrated in FIG. 1, the method includes the following actions.

At S110, a user identifier of a target audience logging into the first terminal is obtained. The method for video recording according to embodiments of the present disclosure may be implemented by a terminal device. In detail, the terminal device may be a smart phone or a computer.

Currently, when an anchor is broadcasting live on the second terminal, audiences watch a live video of the anchor through the first terminal. When the target audience logs into the first terminal, the user identifier of the target audience logging into the first terminal is obtained. The user identifier of the target audience may be a user name of the target audience or an account of the target audience. For example, the terminal device downloads the user identifier of the target audience logging into the first terminal to local.

At S120, voice data of an anchor in the live video within a time period is obtained in response to detecting a first event.

In the process of live broadcasting, the above-mentioned target audience could send a single gift or a plurality of gifts to the anchor. A gift level and a value of the gift are set for the single gift, and the number of gifts is included in the case of the plurality of the gifts.

In a possible implementation, the first event includes:

a value of gifts sent by the target audience to the anchor exceeding a value threshold; or a number of the gifts sent by the target audience to the anchor exceeding a number threshold; or a level of the gift sent by the target audience to the anchor exceeding a level threshold.

The first event may be that the value of the gifts sent by the target audience to the anchor exceeding the value threshold; or the number of the gifts sent by the target audience to the anchor exceeding the number threshold; or a level of the gift sent by the target audience to the anchor exceeding the level threshold. When one or more of the above events occur, voice data of the anchor in the live video of the second terminal within a time period after the current time point is obtained, in which the preset time period is set according to actual requirements. For example, the gifts sent by the audiences to the anchor have 3 levels, gift 1, gift 2, and gift 3. The above three levels correspond to different prices, the price of gift 1 is 8 yuan, the price of gift 2 is 18 yuan, and the price of gift 3 is 88 yuan. If a target audience A sends one gift 3 to the anchor, the level of the gift 3 sent by the target audience to the anchor exceeds a preset level 2, which indicates that the preset event is detected. For example, if the target audience A sends 100 gifts 1 to the anchor, the number of gifts 1 sent by the target audience A to the anchor exceeds a number threshold 88 for gift 1, which indicates that the preset event is detected. For example, if the target audience A sends 30 gifts 1 and 20 gifts 2 to the anchor, the value of gifts sent exceeds a value threshold of 400 yuan, which indicates that the preset event is detected. When the preset event is detected, the voice data of the anchor in the live video of the second terminal in the preset time period after the current time point is obtained. For example, the voice data of the anchor is obtained from the live video of the second terminal within 20 s after the current time point, and the voice data of the anchor is used to determine whether the anchor speaks to the target audience A within 20 s after the current time point. In detail, when the anchor receives the gifts from the target audience, the anchor says some words of thanks to the target audience.

At S130, a video is generated through screen recording based on the user identifier and the voice data.

It is possible to determine whether the voice data of the anchor is related to the target audience and further perform screen recording according to the user identifier of the target audience and the voice data of the anchor.

In a possible implementation, performing the screen recording according to the user identifier of the target audience and the voice data of the anchor includes:

determining whether the voice data of the anchor is related to the target audience according to the user identifier of the target audience and the voice data of the anchor; and starting the screen recording when the voice data of the anchor is related to the target audience.

For example, it is determined whether the voice data of the anchor is related to the target audience according to the user identifier of the target audience and the voice data of the anchor. For example, the user identifier of the target audience is A, and the user identifier of the target audience is converted by a preset conversion model to obtain a feature of the user identifier of the target audience. Feature extraction is performed on the voice data of the anchor according to the type of the feature of the user identifier of the target audience, to obtain a feature of the voice data. For example, if the feature of the user identifier of the target audience is an audio feature, feature extraction is performed on the voice data of the anchor to obtain the audio feature of the voice data of the anchor correspondingly. For example, the voice feature of the user identifier of the target audience is a text pinyin feature, the voice data of the anchor is converted into the corresponding Pinyin text. A similarity calculation is performed between the feature of the user identifier of the target audience and the feature of the voice data of the anchor according to a preset algorithm, to obtain a similarity. In detail, the similarity calculation may be performed between the feature of the user identifier of the target audience and the feature of the voice data of the anchor according to a dynamic time warping algorithm, to obtain the similarity. When the similarity exceeds a similarity threshold, it is determined that the voice data of the anchor is related to the target audience. When the similarity does not exceed the similarity threshold, it is determined that the voice data of the anchor is not related to the target audience. For example, if the similarity is 0.7, which exceeds the similarity threshold of 0.5, it is determined that the voice data of the anchor is related to the target audience. When the voice data of the anchor is related to the target audience, screen recording is performed. Therefore, automatic recording of great contents during live broadcasting on the first terminal is realized and the interactive experience of the audience is improved.

For example, the user identifier of the target audience is the user name "zhangsan123" of the target audience, and "zhangsan" is extracted from the voice data of the anchor after the feature extraction, then it may be determined that the voice data of the anchor is related to the target audience.

When the voice data of the anchor is related to the target audience, screen recording is performed. That is, the target audience A sends one gift 3 to the anchor, and the gift 3 sent by the target audience to the anchor exceeds the preset level 2, and thus the voice data of the anchor in the live video of the second terminal within 20 s after the current time point is obtained. The user identifier of the target audience is converted into the feature. Meanwhile, feature extraction is performed on the voice data of the anchor and the voice data is converted into corresponding feature. By calculation, the similarity between the voice data and the user identifier of the target audience is 0.7, which exceeds the similarity threshold value of 0.5, it is determined that the voice data of the anchor is related to the target audience, and screen recording is performed. Further, a video of a certain duration may be recorded, for example, a 20 s video is recorded. Furthermore, a button for downloading the video to local is generated on a screen of the first terminal. The audience may download the 20 s video to local by operating the above button. In addition, the 20 s video may be downloaded automatically and uploaded to a home page corresponding to the target audience automatically.

In a process of playing the live video of the second terminal, in response to detecting that the preset event occurs, voice data of the anchor in the live video of the second terminal within the preset time period after a current time when it is detected that the preset event occurs is obtained. Screen recording is performed according to the user identifier of the target audience and the voice data of the anchor. Therefore, automatic recording of great contents during live broadcasting on the first terminal is realized and the interactive experience of the audience is improved.

The feature extraction may be performed on the voice data of the anchor based on a Mel Frequency Cepstral Coefficient (MFCC) method to obtain the feature of the voice data of the anchor, so as to determine whether the anchor speaks to the target audience A after the target audience A has sent a gift exceeding the preset level to the anchor.

The dynamic time warping algorithm overcomes the difference in the length of the pronunciation of the same sound. The input voice signal is extended or shortened until it is consistent with the length of the standard mode. According to the dynamic time warping algorithm, the similarity calculation is performed to obtain the target similarity, for improving the calculation accuracy.

In some embodiments, starting the screen recording includes:

starting the screen recording at a time point before the current time point; or starting the screen recording at the current time point; or starting the screen recording at a time point after the current time point.

The screen recording may be started from a time point before the current time point, from the current time point, or from a time point after the current time point. For example, when the voice data of the anchor is related to the above-mentioned target audience, the screen recording starts from the time point the first preset duration before the current time point. The first preset duration may be set according to the actual situation, for example, 10 seconds, 15 seconds or 20 seconds. According to requirements, in order to capture the great moments in the process of watching the live broadcast of the anchor, the video for a duration before the current time point in the broadcast may be cached. For example, in the process of watching the live broadcast of the anchor, the cached video 20 s before the current time point in the live broadcast is always cached. For example, at 19 s, a 19 s video is cached, and after watching the broadcast for 60 s, a video from 40 s to 60 s of the live video is cached. When the voice data of the anchor is related to the target audience, according to the time point when the voice data of the anchor is related to the target audience, a cached video of the first preset duration before the time point is obtained from the cache of the first terminal, for example, the cached video 20 s before the above time point is obtained. That is, the screen recording is started 20 s before the above time point.

Alternatively, when the voice data of the anchor is related to the target audience, the screen recording is started from the current time point. Or, when the voice data of the anchor is related to the target audience, the screen recording is started from a time point a second preset time period after the current time point.

In a possible implementation, after starting the screen recording, the method further includes:

ending the screen recording after a preset duration of the screen recording; or ending the screen recording when a second preset event occurring at the first terminal is detected.

In the process of playing the live video of the second terminal, when a preset event is detected, the voice data of the anchor in the live video of the second terminal in the preset time period after the current moment is obtained, and screen recording is performed according to the user identifier of the target audience and the voice data of the anchor. Therefore, automatic recording of great contents during live broadcasting on the first terminal is realized and the interactive experience of the audience is improved.

In a possible implementation, ending the screen recording when the second preset event occurring at the first terminal is detected includes:

when it is monitored that a preset special effect has been displayed a first number of times on the screen of the first terminal, ending the screen recording; or when it is detected that the first terminal receives a preset audio signal, ending the screen recording.

After starting the screen recording for the preset duration, the screen recording is ended. That is, the screen recording may be performed for the preset duration. For example, when the voice data of the anchor is related to the target audience, the screen recording starts from the current time point, and then after 20 s, the screen recording is ended to obtain a 20 s screen recording video, in which the preset duration is set according to requirements.

In addition, the screen recording may also be ended when the second preset event is detected on the first terminal. For example, when it is monitored that the display number of preset special effects displayed on the screen of the first terminal reaches the first number, the screen recording is ended. For example, if the time of a gift special effect is 5 s, the screen recording is ended when 5 gift special effects are detected, or when it is monitored that the first terminal receives the preset audio signal. For example, the screen recording is started at the current point, then the first terminal receives the preset audio signal including the words of thanks from the anchor to the current audience, and when it is detected that the anchor mentions names of other audiences, the screen recording for the current audience is ended. The above second preset event is set according to actual requirements.

In a possible implementation, when the voice data of the anchor is related to the target audience, the method further includes:

displaying a preset download option on the first terminal; and saving a screen recording video locally when obtaining a specified operation of the target audience for the preset download option.

In detail, when the voice data of the anchor is related to the target audience, a button for downloading videos locally is generated on the screen of the first terminal. The audience may operate the button. The screen recording video is saved locally when obtaining the specified operation of the target audience for the preset download option.

In a possible implementation, when a preset event is detected, the screen recording lasting for a preset duration is performed to obtain a screen recording video, for example, the screen recording is performed for 20 s to obtain a 20 s screen recording video. Then the voice data of the anchor in the screen recording video is obtained. In detail, the feature extraction is performed on the voice data of the anchor in the screen recording video based on the MFCC method to obtain the feature of the voice data of the anchor. For example, the voice data of the anchor is obtained from the above 20 s screen recording video, so as to determine whether the anchor speaks to the target audience A after the target audience A has sent a gift exceeding the preset level to the anchor. According to the user identifier of the target audience and the voice data of the anchor in the screen recording video, it is determined whether the voice data of the anchor is related to the target audience. When the voice data of the anchor is related to the target audience, the screen recording video is stored, and when the voice data of the anchor is not related to the target audience, the screen recording video is deleted, thereby saving memory space on the audience side.

Figure 2:
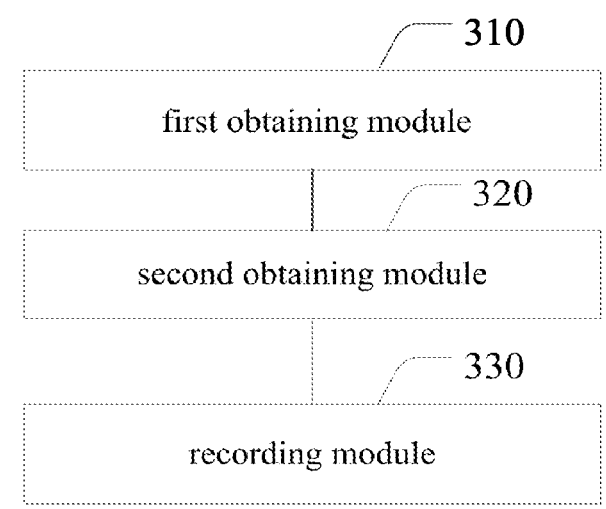
FIG. 2 is a block diagram of an apparatus for video recording according to an embodiment.

FIG. 2 is a block diagram of an apparatus for video recording according to an embodiment. The apparatus for video recording is applicable for a first terminal, in which the first terminal is configured to play a live video of a second terminal when the second terminal is on live. As illustrated in FIG. 2, the apparatus includes: a first obtaining module 310, a second obtaining module 320, and a recording module 330.

The first obtaining module 310 is configured to obtain a user identifier of a target audience logged into the first terminal.

The second obtaining module 320 is configured to obtain voice data of an anchor in the live video within a time period in response to detecting a first event, in which the time period is after a current time point.

The recording module 330 is configured to generate a video through screen recording based on the user identifier and the voice data.

In a possible implementation, the first event includes: a value of gifts sent by the target audience to the anchor exceeding a value threshold; or a number of the gifts sent by the target audience to the anchor exceeding a number threshold; or a level of the gift sent by the target audience to the anchor exceeding a level threshold.

In a possible implementation, the recording module 330 is specifically configured to:

determine whether the voice data of the anchor is related to the target audience according to the user identifier of the target audience and the voice data of the anchor; and when the voice data of the anchor is related to the target audience, start the screen recording.

In a possible implementation, the recording module 330 is specifically configured to: extract a first feature of the user identifier; extract a second feature of the voice data; and determining whether the voice data is related to the target audience based on the first feature and the second feature.

In a possible implementation, the recording module 330 is specifically configured to:

calculate a similarity between the first feature and the second feature; and when the similarity exceeds a preset threshold, determine that the voice data of the anchor is related to the target audience.

In a possible implementation, the recording module 330 is specifically configured to:

start the screen recording at a time point before the current time point; or start the screen recording at the current time point; or start the screen recording at a time point after the current time point.

In a possible implementation, the apparatus further includes an ending module. The ending module is configured to:

end the screen recording after a preset duration of the screen recording; or end the screen recording when a second preset event occurring at the first terminal is detected.

In a possible implementation, the ending module is configured to:

when it is monitored that a preset special effect has been displayed a first number of times on the screen of the first terminal, end the screen recording; or when it is detected that the first terminal receives a preset audio signal, end the screen recording.

In a possible implementation, the apparatus further includes a displaying module and a storing module.

The displaying module is configured to display a preset download option on the first terminal.

The storing module is configured to save a screen recording video to local, when obtaining a specified operation of the target audience for the preset download option.

Regarding the apparatus in the foregoing embodiments, the specific manner in which each module performs the operation has been described in detail in the embodiments of the method, and detailed description will not be given here.

Embodiments of the present disclosure further provide a terminal device. The terminal device includes a processor, a communication interface, a memory, and a communication bus. The processor, the communication interface and the memory complete mutual communication through the communication bus. The memory is configured to store computer programs. The processor is configured to implement the following acts by executing the computer program stored in the memory:

obtaining a user identifier of a target audience logging into the terminal device, the terminal device is configured to play a live video of a further terminal device when the terminal device is on live;

obtaining voice data of an anchor in the live video within a time period in response to detecting a first event, wherein the time period is after a current time point; and generating a video through screen recording based on the user identifier and the voice data.

Optionally, the processor is further configured to implement any of the above-mentioned method for video recording applicable for the first terminal by executing the program stored in the memory.

The communication bus mentioned in the above terminal device may be a Peripheral Component Interconnect (PCI) bus or an Extended Industry Standard Architecture (EISA) bus. The communication bus is divided into address bus, data bus and control bus. For ease of representation, only one thick line is used in the figure, but it does not mean that there is only one bus or one type of bus.

The communication interface is configured for communication between the aforementioned terminal device and other devices.

The memory may include a Random Access Memory (RAM), and may also include a Non-Volatile Memory (NVM), for example, at least one disk memory. Optionally, the memory may also be at least one storage device located far away from the foregoing processor.

The above-mentioned processor may be a general processor including a Central Processing Unit (CPU), a Network Processor (NP). The above-mentioned processor may be also be a Digital Signal Processing (DSP), an Application Specific Integrated Circuit (ASIC), a Field-Programmable Gate Array (FPGA) or other programmable logic devices, discrete gates, transistor logic devices, or discrete hardware components.

Figure 3:
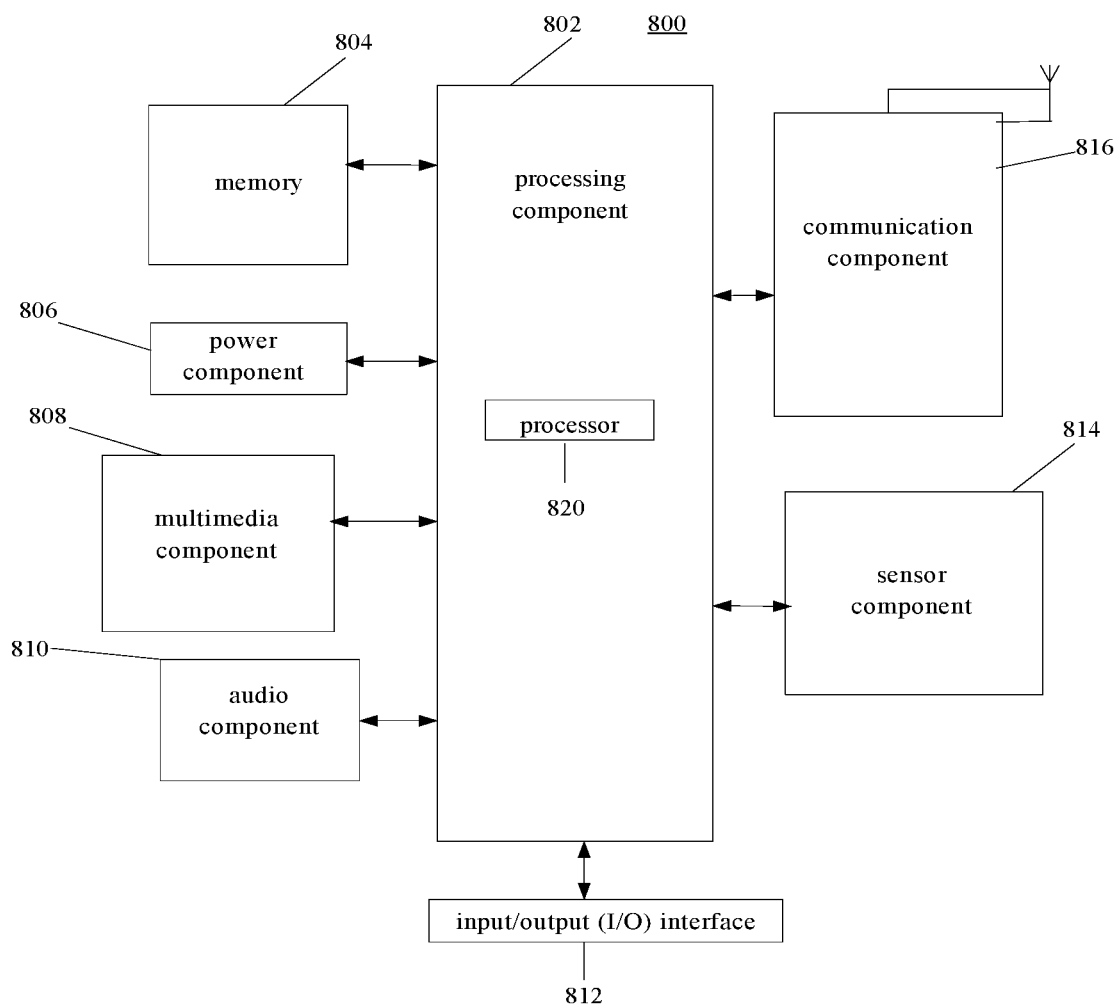
FIG. 3 is a block diagram of a first kind of terminal device according to an embodiment.

FIG. 3 is a block diagram of a first kind of terminal device according to an embodiment. As illustrated in FIG. 3, the terminal device 800 may be a mobile phone, a computer, a digital broadcasting terminal, a messaging device, a game console, a tablet device, a medical device, a fitness device, and a personal digital assistant.

As illustrated in FIG. 3, the terminal device 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the terminal device 800, such as the operations associated with display, telephone calls, data communications, camera operations, and recording operations. The processing component 802 may include one or more processors 820 to execute instructions to perform all or part of the steps in the above described method. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the terminal device 800. Examples of such data include instructions for any applications or methods operated on the terminal device 800, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the terminal device 800. The power component 806 may include a power management system, one or more power sources, and any other components associated with the generation, management, and distribution of power in the terminal device 800.

The multimedia component 808 includes a screen providing an output interface between the terminal device 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. When the terminal device 800 is in an operation mode, such as a shooting mode or a video mode, the front camera and/or the rear camera may receive external multimedia data. Each front camera and rear camera can be a fixed optical lens system or have focal length and optical zoom capabilities.

The audio component 810 is configured to output and/or input audio signals. For example, the audio component 810 includes a microphone ("MIC") configured to receive an external audio signal when the terminal device 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the terminal device 800. For instance, the sensor component 814 may detect an open/closed status of the terminal device 800, relative positioning of components, e.g., the display and the keypad, of the terminal device 800, a change in position of the terminal device 800 or a component of the terminal device 800, a presence or absence of user contact with the terminal device 800, an orientation or an acceleration/deceleration of the terminal device 800, and a change in temperature of the terminal device 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may further include an acceleration sensor, a gyro sensor, a magnetic sensor, a pressure sensor, or a temperature sensor.

The communication component 816 is configured to facilitate communication, wired or wirelessly, between the terminal device 800 and other devices. The terminal device 800 can access a wireless network based on a communication standard, such as WiFi, 2G, or 3G, or a combination thereof. In some embodiments, the communication component 816 receives a broadcast signal or broadcast associated information from an external broadcast management system via a broadcast channel. In some embodiments, the communication component 816 further includes a near field communication (NFC) module to facilitate short-range communications. For example, the NFC module may be implemented based on a radio frequency identity (RFID) technology, an infrared data association (IrDA) technology, an ultra-wideband (UWB) technology, a Bluetooth (BT) technology, and other technologies.

In some embodiments, the terminal device 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described method.

Figure 4:
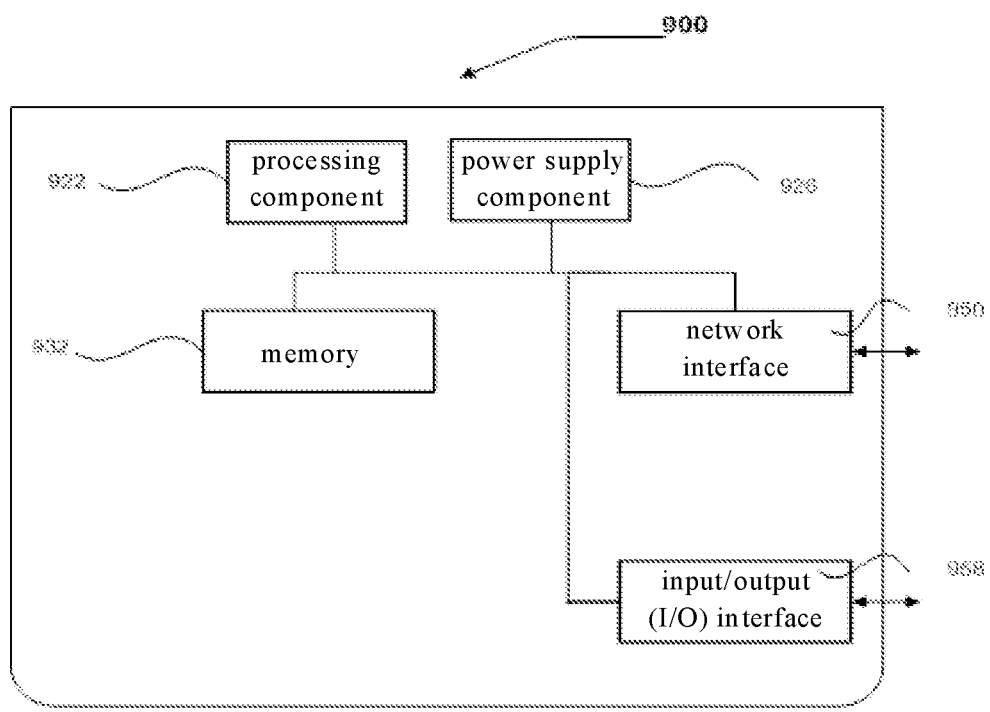
FIG. 4 is a block diagram of a second kind of terminal device according to an embodiment.

FIG. 4 is a block diagram of a second kind of terminal device according to an exemplary embodiment. For example, the terminal device 900 may be provided as a server. As illustrated in FIG. 4, the terminal device 900 includes a processing component 922, which further includes one or more processors, and a memory resource represented by a memory 932 for storing instructions that can be executed by the processing component 922, such as application programs. The application program stored in the memory 932 may include one or more modules each corresponding to a set of instructions. In addition, the processing component 922 is configured to execute instructions to execute the aforementioned method for video recording.

The terminal device 900 may also include a power supply component 926 configured to perform power management of the terminal device 900, a wired or wireless network interface 950 configured to connect the terminal device 900 to a network, and an input/output (I/O) interface 958. The terminal device 900 may operate based on an operating system stored in the memory 932, such as Windows Server™, Mac OS X™, Unix™, Linux™, FreeBSD™ or the like.

In some embodiments, a storage medium including instructions is provided. When the instructions stored on the storage medium are running on a computer, the computer is caused to execute any of the above-mentioned method for video recording applicable for the first terminal in the above embodiments. In an exemplary embodiment, a storage medium including instructions is also provided, such as the memory 804 including instructions, and the foregoing instructions may be executed by the processor 820 of the terminal device 800 to complete the foregoing method. Optionally, the storage medium may be a non-transitory computer-readable storage medium, for example, the non-transitory computer-readable storage medium may be a ROM, a random access memory (RAM), a CD-ROM, a magnetic tape, a floppy disk, and an optical data storage device.

In some embodiments, there is also provided a computer program product containing instructions, which when run on a computer, cause the computer to execute any of the above-mentioned method for video recording applicable for the first terminal in the above-mentioned embodiments. Those skilled in the art will easily think of other embodiments of the present disclosure after considering the specification and practicing the application disclosed herein. This application is intended to cover any variations, uses, or adaptive changes of the present disclosure, which follow the general principles of the present disclosure and include common knowledge or conventional technical means in the technical field not disclosed in the present disclosure. The description and the embodiments are to be regarded as exemplary only, and the true scope and spirit of the present disclosure are pointed out by the claims.

It should be understood that the present disclosure is not limited to the precise structure that has been described above and shown in the drawings, and various modifications and changes can be made without departing from the scope. The scope of the present disclosure is limited only by the appended claims.

What is claimed is:

1. A method for video recording, applicable for a first terminal, wherein the first terminal is configured to play a live video of a second terminal when the second terminal is on live, the method comprising:
   obtaining a user identifier of a target audience logging into the first terminal;
   obtaining voice data of an anchor in the live video within a time period in response to detecting a first event, wherein the time period is after a current time point; and
   generating a video through screen recording based on the user identifier and the voice data;
   wherein said generating the video through screen recording based on the user identifier and the voice data comprising:
   determining whether the voice data is related to the target audience based on the user identifier; and
   generating the video through screen recording based on the voice data being related to the target audience.

2. The method according to claim 1, wherein the first event comprising:
   a value of gifts from the target audience exceeding a value threshold;
   a number of the gifts from the target audience exceeding a number threshold; or
   a level of the gift from the target audience exceeding a level threshold.

3. The method according to claim 1, wherein said determining whether the voice data is related to the target audience based on the user identifier comprising:
   extracting a first feature of the user identifier;
   extracting a second feature of the voice data;
   determining whether the voice data is related to the target audience based on the first feature and the second feature.

4. The method according to claim 3, wherein said determining whether the voice data is related to the target audience based on the first feature and the second feature comprising:
   calculating a similarity between the first feature and the second feature;
   determining that the voice data is related to the target audience based on the similarity greater than a similarity threshold.

5. The method according to claim 1, wherein said generating the video through screen recording comprising:
   starting the screen recording at the current time point, or at a time point before the current time point, or at a time point after the current time point.

6. The method according to claim 1, further comprising:
   ending the screen recording based on the video recorded for a preset duration; or
   ending the screen recording in response to detecting a second event.

7. The method according to claim 6, wherein the second event comprises:
   displaying a preset special effect a first number of times; or
   receiving a preset audio signal.

8. The method according to claim 1, further comprising:
   displaying a download option on the first terminal based on the voice data being related to the target audience; and
   saving the video to local in response to selecting the download option.

9. A terminal device, comprising a processor, a communication interface, a memory, and a communication bus, wherein
   the processor, the communication interface, and the memory are configured to implement mutual communication through the communication bus;
   the memory is configured to store computer programs; and
   the processor is configured to implement a method for video recording by executing the computer program stored in the memory, the method comprising:
   obtaining a user identifier of a target audience logging into the terminal device, wherein the terminal device is configured to play a live video of a further terminal device when the further terminal device is on live;
   obtaining voice data of an anchor in the live video within a time period in response to detecting a first event, wherein the time period is after a current time point; and
   generating a video through screen recording based on the user identifier and the voice data;
   wherein the processor is configured to:
   determine whether the voice data is related to the target audience based on the user identifier; and generate the video through screen recording based on the voice data being related to the target audience.

10. The terminal device according to claim 9, wherein the first event comprising:
   a value of gifts from the target audience exceeding a value threshold;
   a number of the gifts from the target audience exceeding a number threshold; or
   a level of the gift sent by the target audience exceeding a level threshold.

11. The terminal device according to claim 9, wherein the processor is configured to:
   extract a first feature of the user identifier;
   extract a second feature of the voice data; and
   determine whether the voice data is related to the target audience based on the first feature and the second feature.

12. The terminal device according to claim 11, wherein the processor is configured to:
   calculate a similarity between the first feature and the second feature; and
   determine that the voice data is related to the target audience based on the similarity greater than a similarity threshold.

13. The terminal device according to claim 9, wherein the processor is configured to:
   start the screen recording at the current time point, or at a time point before the current time point, or at a time point after the current time point.

14. The terminal device according to claim 9, wherein the processor is further configured to:
   end the screen recording based on the video recorded for a preset duration; or
   end the screen recording in response to detecting a second event.

15. The terminal device according to claim 14, wherein the second event comprises:
   displaying a preset special effect a first number of times; or
   receiving a preset audio signal.

16. The terminal device according to claim 9, wherein the processor is further configured to:
   display a download option on the terminal device based on the voice data being related to the target audience; and
   save the video to local in response to selecting the download option.

17. A non-transitory storage medium, wherein a computer program is stored in the storage medium, and a method for video recording is implemented when the computer program is executed by a processor, the method comprising:
   obtaining a user identifier of a target audience logging into a first terminal, wherein the first terminal is configured to play a live video of a second terminal when the second terminal is on live;
   obtaining voice data of an anchor in the live video within a time period in response to detecting a first event, wherein the time period is after a current time point; and
   generating a video through screen recording based on the user identifier and the voice data;
   wherein said generating the video through screen recording based on the user identifier and the voice data comprising:
   determining whether the voice data is related to the target audience based on the user identifier; and
   generating the video through screen recording based on the voice data being related to the target audience.

* * * * *